(12) United States Patent
Kaneko et al.

(10) Patent No.: US 7,954,154 B2
(45) Date of Patent: May 31, 2011

(54) COMMUNICATION SYSTEM AND COMMUNICATION APPARATUS

(75) Inventors: Tomoharu Kaneko, Kanagawa (JP); Tatsuya Inagaki, Tokyo (JP)

(73) Assignee: Panasonic Corporation, Osaka (JP)

( * ) Notice: Subject to any disclaimer, the term of this patent is extended or adjusted under 35 U.S.C. 154(b) by 638 days.

(21) Appl. No.: 11/630,143

(22) PCT Filed: Jun. 3, 2005

(86) PCT No.: PCT/JP2005/010262
§ 371 (c)(1),
(2), (4) Date: Nov. 23, 2007

(87) PCT Pub. No.: WO2005/125082
PCT Pub. Date: Dec. 29, 2005

(65) Prior Publication Data
US 2008/0212778 A1    Sep. 4, 2008

(30) Foreign Application Priority Data

Jun. 22, 2004    (JP) .................................. 2004-184165

(51) Int. Cl.
*H04L 29/00* (2006.01)
(52) U.S. Cl. ............... 726/22; 726/23; 726/24; 726/25; 726/26; 709/229; 713/200; 713/201
(58) Field of Classification Search .................. 380/277; 713/171; 726/4–6, 17–18
See application file for complete search history.

(56) References Cited

U.S. PATENT DOCUMENTS

| | | | |
|---|---|---|---|
| 4,689,606 A | | 8/1987 | Sato |
| 7,512,791 B1 | * | 3/2009 | Sato ............................... 713/166 |
| 2003/0061518 A1 | | 3/2003 | Yamaguchi et al. |
| 2003/0096625 A1 | * | 5/2003 | Lee et al. ..................... 455/466 |
| 2004/0105549 A1 | | 6/2004 | Suzuki et al. |

(Continued)

FOREIGN PATENT DOCUMENTS

JP    61-296835    12/1986

(Continued)

OTHER PUBLICATIONS

Japanese Office Action dated Aug. 26, 2008 with English translation thereof.

(Continued)

*Primary Examiner* — Vivek Srivastava
*Assistant Examiner* — Anthony Brown
(74) *Attorney, Agent, or Firm* — Seed IP Law Group PLLC

(57) ABSTRACT

A communication system and communication apparatus that can improve the stability and security of communication. In this communication system, a communication apparatus (101) generates, at a predetermined interval, a keep-alive message based on key information stored in a key information database part (113) and transmits the keep-alive message to a communication apparatus (102). The communication apparatus (102) receives the keep-alive message from the communication apparatus (101), and a key information updating part (157) updates (for example, corrects), based on this keep-alive message, the data stored in a key information database part (154). In this way, the information stored in the communication apparatus (101) and the information stored in the communication apparatus (102) can be made common, and problems, such as a communication interruption, caused by disagreement between the information stored in the communication apparatus (101) and the information stored in the communication apparatus (102) can be solved, resulting in improvement of the stability and security of communication between the two communication apparatuses.

8 Claims, 5 Drawing Sheets

U.S. PATENT DOCUMENTS

2005/0013440 A1 * 1/2005 Akiyama et al. .............. 380/277

FOREIGN PATENT DOCUMENTS

| JP | 10-276186 | 10/1998 |
|---|---|---|
| JP | 11212926 | 8/1999 |
| JP | 2001292135 | 10/2001 |
| JP | 2003101533 | 4/2003 |
| JP | 2003-244120 | 8/2003 |
| JP | 2004-096583 | 3/2004 |
| JP | 2004166153 | 6/2004 |

OTHER PUBLICATIONS

PCT International Search Report dated Oct. 4, 2005.

* cited by examiner

| MESSAGE TYPE (16) | MESSAGE LENGTH (16) | KEY IDENTIFICATION INFORMATION (32) | EXPIRATION TIME (32) | STATUS (32) | KEY IDENTIFICATION INFORMATION (32) | EXPIRATION TIME (32) | STATUS (32) | . . . |

FIG.2

| KEY IDENTIFICATION INFORMATION | COMMUNICATING DESTINATION DEVICE IDENTIFICATION INFORMATION | EXPIRATION TIME (LEFT TIME) | STATE OF USE |
|---|---|---|---|
| 1234 | COMMUNICATION APPARATUS 102 | 7600 sec. | UNUSED |
| 4033 | COMMUNICATION APPARATUS 102 | 4833 sec. | IN USE |
| 2234 | DEVICE A | 3633 sec. | IN USE |
| ... | ... | ... | ... |

FIG.4

COMMUNICATION SYSTEM AND COMMUNICATION APPARATUS

TECHNICAL FIELD

The present invention relates to a communication system and communication apparatus, and, more specifically, relates to a communication system and communication apparatus that improve stability and security of communication.

BACKGROUND ART

As a security technique for the Internet, IPSec (IP Security) is known. With IPSec, it is necessary to implement the IKE (Internet Key Exchange) protocol to realize a safe key exchange. However, IKE requires communication apparatuses for carrying out communication to hold setting information individually, so that the operation becomes complicated. Here, a conventional scheme is proposed where an simplified key exchange is performed for enabling smooth operation by distributing the keys to the specified apparatus (see, Patent Document 1).

In the communication system where this conventional key exchanging scheme is adopted, an expiration time is assigned to the key in order to ensure communication security. As the expiration time approaches, the communication apparatus which is communicating acquires a new key by requesting the distribution of a new key to the key distributing apparatus, and updates the key.

Patent Document 1: Japanese Patent Application Laid-Open No. 2001-292135

DISCLOSURE OF INVENTION

Problems to be Solved by the Invention

However, there are few cases in which clocks mounted in communication apparatuses tick at exactly the same rate, and there is usually a slight time difference between the clocks. Therefore, if the expiration time of the key is too long, difference of the time managed between two communication apparatuses which are communicating increases, and the difference of the expiration times also increases. As a result, a problem occurs where the key is invalid in one communication apparatus only, and communication cannot be continued between the above two communication apparatuses.

Further, when the key is updated, with a timing where only one communication apparatus finishes the key updating between communicating apparatuses which carry out communication, the other communication apparatus does not have a new key, which result in a problem that it is not possible to receive data transmitted using this new key, and to continue communication.

It is therefore an object of the present invention to provide a communication system and communication apparatus that prevents the case where the key is invalid in one communication apparatus only and that improve the stability and security of communication.

Means for Solving the Problem

A communication system according to the present invention adopts a configuration where a communication system carrying out communication using a key between a first communication apparatus and a second communication apparatus, that the first communication apparatus includes a storing section that stores key information including an expiration time of the key, and a transmission section that transmits the key information per predetermined intervals, and the second communication apparatus includes another storing section that stores different key information including the expiration time of the key, a receiving section that receives the key information from the first communication apparatus, and a correcting section that corrects the different key information stored in another storing section with the key information received at the receiving section.

Advantageous Effect of the Invention

According to the present invention, it is possible to provide a communication system and communication apparatus that improve the stability and security of the communication by making information stored in the communication apparatus and information stored in another communication apparatus common, and resolving communication disconnection due to mismatching of information stored in the communication apparatus and another communication apparatus.

BRIEF DESCRIPTION OF DRAWINGS

FIG. 2 shows an example of a configuration of a message;

FIG. 4 shows an example of a configuration of a key information database section.

BEST MODE FOR CARRYING OUT THE INVENTION

Now, an embodiment of the present invention will be described in detail with reference to the accompanying drawings.

First, the configuration of communication system 100 according to this embodiment will be described with reference to FIG. 1.

Figure 1:
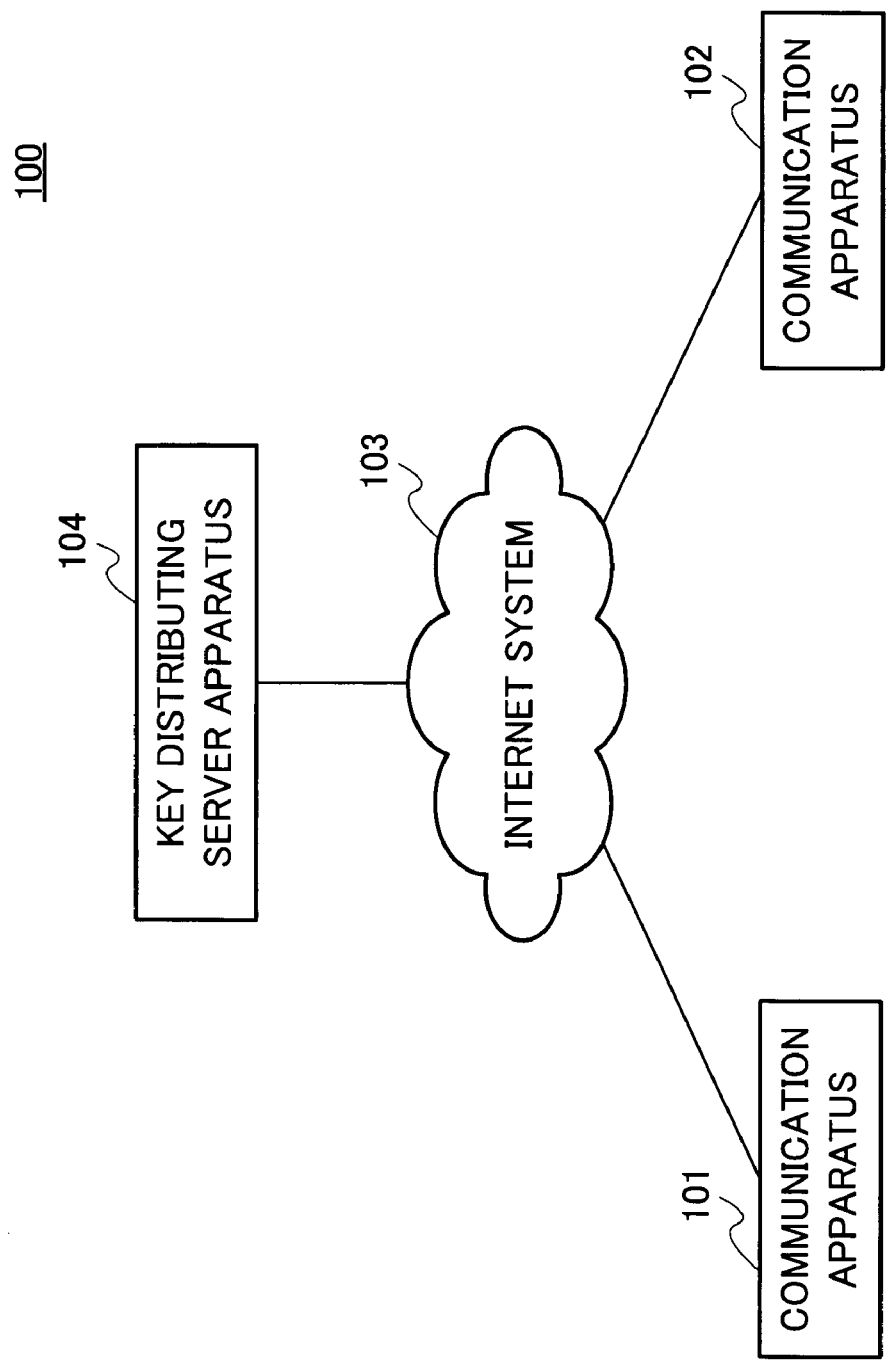
FIG. 1 is an overall configuration diagram of a communication system according to an embodiment.

As shown in FIG. 1, communication system 100 is equipped with communication apparatus 101, communication apparatus 102, Internet system 103 and key distributing server apparatus 104.

This communication system 100 adopts IPSec (IP Security). Further, in communication system 100, a key with an expiration time used for encryption and authentication in communication between communication apparatus 101 and communication apparatus 102, is acquired from key distributing server apparatus 104 by each of communication apparatus 101 and communication apparatus 102. By this means, both communication apparatus 101 and communication apparatus 102 share the key used for communication between the apparatuses.

Communication apparatus 101 and communication apparatus 102 each manage the expiration time of the key. More specifically, communication apparatus 101 determines whether the key has expired, at predetermined intervals. As a result of the determination, when the key has expired, communication apparatus 101 acquires a new key instead of the key determined to be expired, from key distributing server apparatus 104. Communication apparatus 102 carries out like operations.

Next, synchronization processing regarding the expiration time of the key which is carried out between communication apparatus 101 and communication apparatus 102 will be described. Here, the following description assumes that communication apparatus 101 operates as an initiator of starting the procedure, and communication apparatus 102 operates as a responder to the initiator.

Communication apparatus 101 generates a keep alive message at predetermined intervals, and transmits this keep alive message to communication apparatus 102 via Internet system 103. This keep alive message includes information such as key identification information, the expiration time of the key and the state of use.

Communication apparatus 102 receives the keep alive message from communication apparatus 101, and searchs as to whether communication apparatus 101 holds key information associated with the key identification information included in this keep alive message. As a result of the search, when communication apparatus 101 does not hold key information associated with the key identification information included in the keep alive message, communication apparatus 102 executes the procedure for acquiring the key of key information from key distributing server apparatus 104.

On the other hand, as a result of the search, when communication apparatus 101 holds key information associated with the key identification information included in the keep alive message, communication apparatus 102 updates various types of information related to key information communication apparatus 101 holds, using information included in the keep alive message. By this means, for example, the expiration time of the key of communication apparatus 101 and the expiration time of the key of communication apparatus 102 are synchronized.

Next, communication apparatus 102 generates a keep alive reply message and transmits this keep alive reply message to communication apparatus 101 via Internet system 103. This keep alive reply message includes information such as the key identification information, the expiration time of the key and the state of use.

Communication apparatus 101 receives the keep alive reply message from communication apparatus 102, and searchs as to whether communication apparatus 101 holds key information associated with the key identification information included in this keep alive reply message. As a result of the search, when communication apparatus 102 does not hold key information associated with the key identification information included in the keep alive reply message, communication apparatus 101 executes the procedure for acquiring the key of key information from key distributing server apparatus 104.

On the other hand, as a result of the search, when communication apparatus 101 holds key information associated with the key identification information included in the keep alive reply message, communication apparatus 101 does not carry out a noticeable operation.

FIG. 2 shows an example of the configuration of the above keep alive message and keep alive reply message. As shown in FIG. 2, the above message includes the message type (indicating whether it is a keep alive message or a keep alive reply message), message length, key identification information, expiration time and status (the state of use.) In addition, the numbers in parenthesis show the number of bits in each information.

Figure 3:
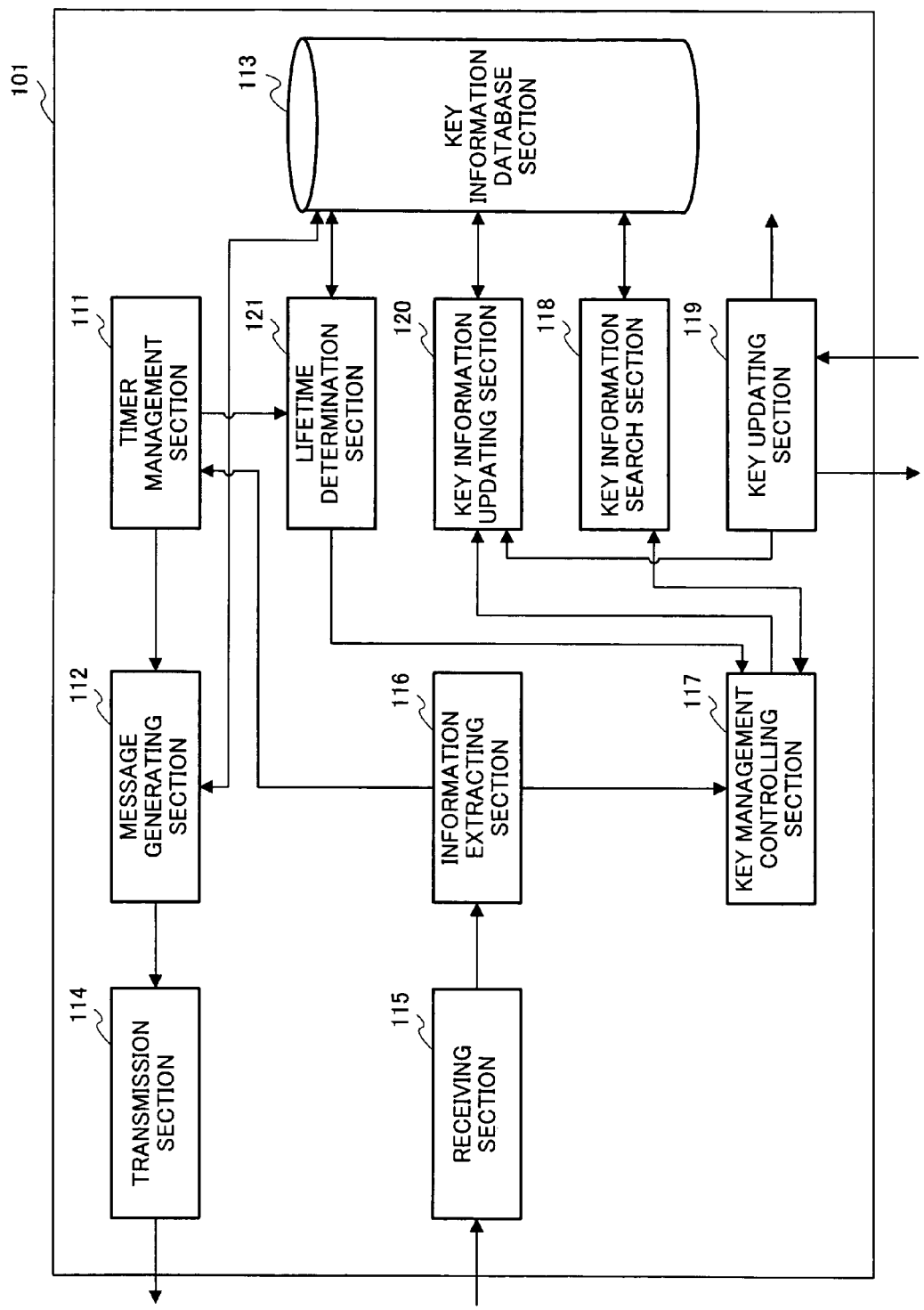
FIG. 3 is a block diagram of a configuration of a communication apparatus in FIG. 1.

FIG. 3 is a block diagram of the configuration of communication apparatus 101.

As shown in FIG. 3, communication apparatus 101 is equipped with timer management section 111, message generating section 112, key information database section 113, transmission section 114, receiving section 115, information extracting section 116, key management controlling section 117, key information search section 118, key updating section 119, key information updating section 120 and lifetime determination section 121.

In communication apparatus 101, timer management section 111 sets a key management timer that expires regularly, to manage the expiration time of key information. Every time this key management timer expires, timer management section 111 outputs timer expiration information indicating that the key management timer has expired, to message generating section 112.

Message generating section 112 generates a keep alive message based on various types of information which are stored in key information database section 113 and related to key information, and outputs this keep alive message to transmission section 114. As shown in FIG. 4, key information database section 113 stores the key identification information, identification information of the device of the communicating destination, the expiration time (the time left until the expiration) and the state of use of the key in association.

Transmission section 114 transmits the keep alive message from message generating section 112 to communication apparatus 102.

Further, in communication apparatus 101, receiving section 115 receives the keep alive reply message from communication apparatus 102 and outputs the message to information extracting section 116.

Information extracting section 116 receives the keep alive reply message from receiving section 115, extracts various types of information included in the keep alive reply message and outputs these information to key management controlling section 117.

Key management controlling section 117 outputs the key identification information received from information extracting section 116 and a search command signal commanding a search as to whether this key identification information is stored in key information database section 113, to key information search section 118.

Key information search section 118 receives the key identification information and search command signal from key management controlling section 117, and searchs key information database section 113 using this key identification information as a search key. Then, upon finishing the search, key information search section 118 outputs search result information to key management controlling section 117.

Key management controlling section 117 receives the search result information from key information search section 118. When this search result information indicates that key identification information does not includes any information for search in key information database section 113, key management controlling section 117 outputs key identification information and an acquisition command signal commanding an acquisition of the key specified by that key identification information from key distribution server apparatus 104, to key updating section 119.

Key updating section 119 receives the key identification information and the acquisition command signal from key management controlling section 117, and acquires the key specified by that key identification information from key distribution server apparatus 104. Key updating section 119 then outputs the acquired key to a key storing section (not shown) and also outputs various types of information related to that key, to key information updating section 120.

Key information updating section 120 carries out processing for storing various types of information from key updating section 119, to key information database section 113.

On the other hand, when the search result information from key information search section 118 indicates that key identification information includes information for search in key information database section 113, key management controlling section 117 does not carry out a noticeable operation.

Further, in communication apparatus 101, timer management section 111 outputs an expiration time check command signal commanding to check the expiration time at predetermined intervals to lifetime determination section 121.

Lifetime determination section 121 determines whether key information stored in key information database section 113 has expired per key identification information. Lifetime determination section 121 then acquires key identification information of the key determined to be expired, and outputs the information to key management controlling section 117.

Upon receiving the key identification information from lifetime determination section 121, key management controlling section 117 outputs the key identification information and acquisition command signal commanding an acquisition of the key specified by the key identification information from key distribution server apparatus 104, to key updating section 119.

Key updating section 119 receives the key identification information and acquisition command signal from key management controlling section 117 and acquires the key specified by the key identification information from key distribution server apparatus 104. Key updating section 119 then outputs the acquired key to a key storing section (not shown) and also outputs various types of information related to the key to key information updating section 120.

Figure 5:
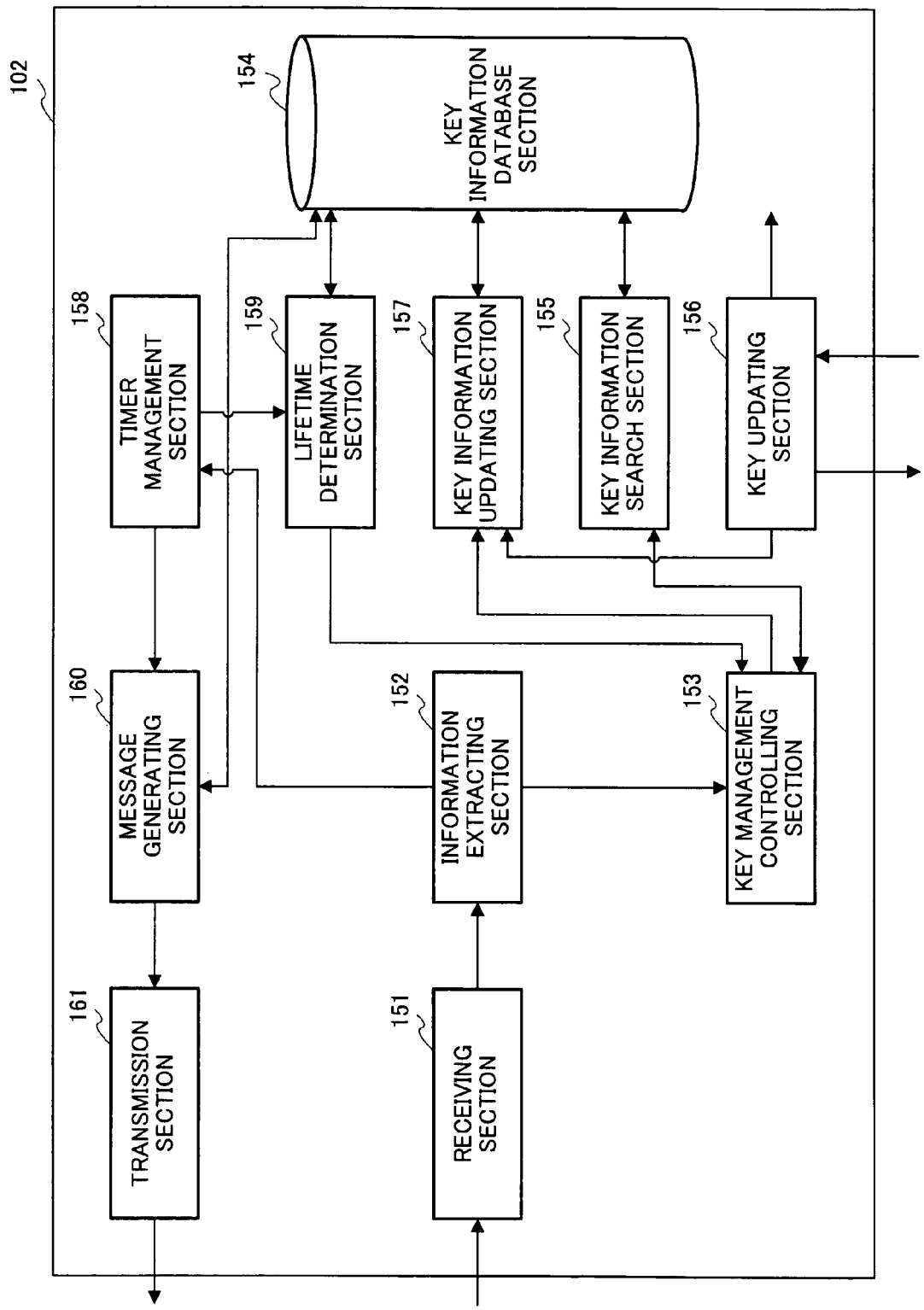
FIG. 5 is a block diagram of a configuration of another communication apparatus in FIG. 1.

FIG. 5 is a block diagram of the configuration of communication apparatus 102.

As shown in FIG. 5, communication apparatus 102 is equipped with receiving section 151, information extracting section 152, key management controlling section 153, key information database section 154, key information search section 155, key updating section 156, key information updating section 157, timer management section 158, lifetime determination section 159, message generating section 160 and transmission section 161.

In communication apparatus 102, receiving section 151 receives a keep alive message from communication apparatus 101 and outputs the message to information extracting section 152.

Information extracting section 152 receives the keep alive message from receiving section 151, extracts various types of information included in the keep alive message, and outputs these information to key management controlling section.

Key management controlling section 153 outputs the key identification information received from information extracting section 152 and a search command signal commanding to search as to whether this key identification information is stored in key information database section 154, to key information search section 155.

Key information search section 155 receives the key identification information and search command signal from key management controlling section 153, and searchs key information database section 154 using this key identification information as a search key. Upon finishing the search, key information search section 155 then outputs search result information to key management controlling section 153.

Key management controlling section 153 receives the search result information from key information search section 155. When this search result information indicates that key identification information does not include any information for search in key information database section 154, key management controlling section 153 outputs the key identification information and an acquisition command signal commanding an acquisition of the key specified by the key identification information from key distributing server apparatus 104, to key updating section 156.

Key updating section 156 receives key identification information and the acquisition command signal from key management controlling section 153, and acquires the key specified by the key identification information from key distributing server apparatus 104. Key updating section 156 outputs the acquired key to a key storing section (not shown) and also outputs various types of information related to that key to key information updating section 157.

Key information updating section 157 carries out processing for storing various types of information from key updating section 156 in key information database section 154.

On the other hand, when the search result information from key information search section 155 indicates that key identification information includes information for search in key information database section 154, key management controlling section 153 outputs an updating command signal commanding to update various types of information from information extracting section 152 and key information, to key information updating section 157.

Key information updating section 157 carries out processing for updating various types of information stored in the key identification information from key management controlling section 153 in association, by overwriting with the various types of information from key management controlling section 153.

When key information updating section 157 finishes processing for storing various types of information in key information database section 154 or processing for overwriting and updating various types of information, key management controlling section 153 outputs a signal commanding a generation of a message to message generating section 160.

Upon receiving the command signal from key management controlling section 153, message generating section 160 generates a keep alive reply message based on various types of information which are stored in key information database section 154 and related to key information, and outputs this keep alive reply message to transmission section 161. As shown in FIG. 4, key information database section 154 stores the key identification information, identification information of the device of the communicating destination, the expiration time (the time left until the expiration) and the state of the key in association.

Further, in communication apparatus 102, timer management section 158 outputs an expiration time check command signal commanding to check as to whether the key has expired at predetermined intervals, to lifetime determination section 159.

Lifetime determination section 159 determines whether the key information stored in key information database section 154 has not expired per key identification information. Lifetime determination section 159 acquires key identification information of the key determined to be expired and outputs the information to key management controlling section 153.

Upon receiving the key identification information from lifetime determination section 159, key management controlling section 153 outputs the key identification information and an acquisition command signal commanding an acquisition of the key specified by that key identification information from key distributing server apparatus 104, to key updating section 156.

Key updating section 156 receives the key identification information and acquisition command signal from key management controlling section 153, and acquires the key specified by that key identification information from key distributing server apparatus 104. Key updating section 156 then outputs the acquired key to a key storing section (not shown) and also outputs various types of information related to that key to key information updating section 157.

The above keep alive message and keep alive reply message may include the current time managed at timer management section 111 and time management section 158. As a result, it is possible to adjust the difference of the current time managed at the timer management section between communication apparatus 101 and communication apparatus 102.

In this case, upon generating a keep alive message, message generating section 112 of communication apparatus 101 acquires the current time from timer management section 111, generates the keep alive message including this current time information and outputs the message to transmission section 114.

Information extracting section 152 of communication apparatus 102 extracts the current time information from the keep alive message from communication apparatus 101 and outputs the information to timer management section 158. Timer management section 158 adjusts the managed current time by the current time information from information extracting section 152.

Then, upon generating a keep alive reply message, message generating section 160 acquires the current time from timer management section 158, generates the keep alive reply message including this current time information and outputs the message to transmission section 161.

Further, in the above description, message generating section 112 generates a keep alive message using information stored in key information database section 113 without change, but when the expiration time is less than a threshold value, the keep alive message may be generated with a zero expiration time.

By this means, communication apparatus 102 receives this keep alive message and overwrites information of key information database section 154 with various types of information included in the message. When lifetime determination section 159 checks the expiration time next time, the key with a zero expiration naturally becomes the trigger of acquisition (key updating) from key distributing server apparatus 104 by key updating section 156. Further, in communication apparatus 101, the key is acquired (updating of the key) almost at the same time as the key acquisition from key distributing server apparatus 104 in communication apparatus 102 by setting the above threshold value appropriately. As a result, the expiration time of the key of communication apparatus 101 and the expiration time of the key of communication apparatus 102 are synchronized.

Instead of generating a keep alive message with a zero expiration time, a configuration may be possible where message generating section 112 of communication apparatus 101 generates a command signal that proposes updating of the key in communication apparatus 102 and also the keep alive message, and outputs the signal and the message to transmission section 114. By this means, the expiration time of the key of communication apparatus 101 and the expiration time of the key of communication apparatus 102 are also synchronized.

In addition, communication between component apparatuses of communication system 100 may be carried out by wireless or by wires.

By this means, according to this embodiment, communication apparatus 101 generates a keep alive message at predetermined intervals based on the key information stored in key information database section 113, and transmits the message to communication apparatus 102. Communication apparatus 102 receives the keep alive message from communication apparatus 101, and, based on this keep alive message, key information updating section 157 updates (corrects or the like) data stored in key information database section 154.

By this means, the problems such as communication disconnection due to mismatching of information stored in the communication apparatus and the different communication apparatus can be resolved by making information stored in the communication apparatus and information stored in the different communication apparatus common, so that it is possible to improve the stability and security of communication between the apparatuses.

The present application is based on Japanese Patent Application No. 2004-184165, filed on Jun. 22, 2004, the entire content of which is expressly incorporated herein by reference.

INDUSTRIAL APPLICABILITY

The present invention is suitable as a communication system and communication apparatus improving the stability and security of communication.

The invention claimed is:

1. A communication system configured to carry out communication between a first communication apparatus and a second communication apparatus using a first key and a second key, wherein:
the first communication apparatus comprises:
a first storing section that is configured to store an expiration time of the first key stored in the first communication apparatus;
a first managing section that is configured to manage expiration of the first key based on the expiration time of the first key stored in the first storing section;
a first communicating section that is configured to transmit a first message including the expiration time of the first key at predetermined intervals; and
the second communication apparatus comprises:
a second storing section that is configured to store an expiration time of the second key stored in the second communication apparatus;
a second managing section that is configured to manage expiration of the second key based on the expiration time of the second key stored in the second storing section;
a second communicating section that is configured to receive the first message; and
a correcting section that is configured to correct the expiration time of the second key stored in the second communication apparatus when the expiration time of the first key and the expiration time of the second key are judged to be different based on the expiration time of the first key included in the first message, and is configured not to correct the expiration time of the second key stored in the second communication apparatus when the expiration time of the first key and the expiration time of the second key are judged to be the same based on the expiration time of the first key included in the first message; and wherein:
the second communicating section is further configured to transmit a second message including the expiration time of the second key having been corrected by the correcting section.

2. The communication system according to claim 1, further comprising a key management apparatus that is configured to manage keys used in communication between the first communication apparatus and the second communication apparatus, wherein:

the first storing section is further configured to store identification information of a first key in association with the expiration time of the first key;

the first communicating section is configured to transmit the first message that further includes the identification information of the first key; and the second communication apparatus further comprises:

a determination section that is configured to determine whether or not a key corresponding to the first key is stored in the second storing section based on the identification information of the first key included in the first message; and a key acquiring section that is configured to acquire the key corresponding to the first key from the key management apparatus when a determination result by the determination section indicates that the storing section of the second communication apparatus has not stored the key corresponding to the first key.

3. The communication system according to claim 2, wherein:

the first communicating section is configured to transmit the first message including a command signal that proposes updating the second key when the expiration time of the first key is less than a threshold value; and the second communicating section is configured to acquire a new second key from the key management apparatus based on the command signal.

4. A first communication apparatus configured to carry out communication with a second communication apparatus using a first key stored in the first communication apparatus and a second key stored in the second communication apparatus, the first communication apparatus comprising:

a storing section that is configured to store an expiration time of the first key;

a managing section that is configured to manage expiration of the first key based on the expiration time of the first key stored in the storing section;

a communicating section that is configured to receive a second message including an expiration time of the second key from the second communication apparatus, the second key being corresponding to the first key and expiration of the second key being managed by the second communication apparatus;

a correcting section that is configured to correct the expiration time of the first key stored in the storing section when the expiration time of the first key and the expiration time of the second key are judged to be different based on the expiration time of the second key included in the second message; and wherein:

the communication section is further configured to transmit a reply message including the expiration time of the first key having been corrected by the correcting section.

5. The first communication apparatus according to claim 4, wherein the communicating section is configured to transmit the first message including a command signal that proposes updating the second key when the expiration time of the first key is less than a threshold value.

6. A first communication apparatus configured to carry out communication with a second communication apparatus using a first key and a second key, the first communication apparatus comprising:

a storing section that is configured to store an expiration time of the first key stored in the first communication apparatus;

a managing section that is configured to manage expiration of the first key based on the expiration time of the first key stored in the storing section;

a receiving section that is configured to receive a second message including an expiration time of the second key, the second key being corresponding to the first key and stored in the second communication apparatus, and expiration of the second key being managed by the second communication apparatus; and a communicating section that is configured to transmit a first message including the expiration time of the first key in response to the second message.

7. The first communication apparatus according to claim 6, wherein:

the receiving section is configured to receive the second message that further includes identification information of the second key; and the first communication apparatus further comprising:

a determination section that is configured to determine whether or not a key corresponding to the second key is stored in the storing section based on the identification information of the second key included in the second message; and a key acquiring section that is configured to acquire the key corresponding to the second key from a key management apparatus when a determination result by the determination section indicates that the storing section has not stored the key corresponding to the second key.

8. The first communication apparatus according to claim 7, wherein:

the receiving section is configured to receive the second message including a command signal that proposes updating the first key when the expiration time of the second key is less than a threshold value; and the key acquiring section is configured to acquire a new first key from the key management apparatus based on the command signal.

* * * * *